Patented Sept. 18, 1923.

1,468,259

UNITED STATES PATENT OFFICE.

CAMPBELL C. CARPENTER, OF NIAGARA FALLS, NEW YORK, ASSIGNOR TO U. S. LIGHT & HEAT CORPORATION, OF NIAGARA FALLS, NEW YORK, A CORPORATION OF NEW YORK.

STORAGE-BATTERY PRACTICE.

No Drawing.   Application filed September 8, 1917.   Serial No. 190,320.

*To all whom it may concern:*

Be it known that I, CAMPBELL C. CARPENTER, a citizen of the United States, residing at Niagara Falls, in the county of Niagara and State of New York, have invented new and useful Improvements in Storage-Battery Practice, of which the following is a specification.

The present invention relates to storage battery practice.

More particularly the present invention relates to storage battery practice whereby batteries may be shipped or stored in a charged condition and retain their capacity for a long period.

An object of the present invention is to provide a method of operating storage batteries whereby said storage batteries may be stored or shipped without the electrolyte and in which the capacity will be maintained for long periods.

A further object is to provide a method of storage battery practice which is simple in operation and inexpensive.

Further objects will be apparent as the description proceeds.

According to the present invention, the storage battery is preferably brought up to full charge in any preferred manner, the electrolyte being tested for its specific gravity to determine when charge is complete. The electrolyte is then removed from the jars and the battery cells and contents thoroughly washed with pure water. In the case of small batteries, the water may be poured into the jars without removing the plates, the water allowed to remain for a few minutes and then poured out. Several washings of this kind should be given, after the last of which, all of the water should be allowed to drain from the cells. In the case of large batteries with heavy plates, the plates, separators and other contents may be removed from the cells, the cells washed out and the plates and other parts thoroughly washed in water. After the cells and plates have been allowed to drain thoroughly, the plates and other parts are replaced in the cells.

After the plates and cells have been thoroughly washed with water and allowed to drain, the cells should be thoroughly sealed. Paraffine, or any other preferred sealing compound may be used. The sealing should be very thorough to prevent access of air to the interior of the cells. It is important that the electrolyte be thoroughly washed out, otherwise the action of the electrolyte on the plates may result in the evolution of gases, resulting in an explosive mixture. Instead of remaining in a free state, the acid of the eletrolyte will act upon the sponge lead of the negative plates, forming sulphate and liberating hydrogen. Therefore, not only will the electrolyte result in the evolution of a dangerous gas, but will discharge the cell to a greater or less extent, depending upon the amount of acid present in the cell.

After the cells have been sealed, they may be shipped or stored for long periods, retaining a very great percentage of their original capacity. When it is desired to put the cells into service, electrolyte of the specific gravity corresponding to full charge may be added to the cells and the cells will perform in the proper manner.

The above described process may be varied in certain particulars, which variations however, will not depart from the spirit of the invention. It is intended that this patent shall cover all modifications that come within the scope of the invention as defined by the appended claims.

What I claim as new and desire to secure by Letters Patent of the United States, is:—

1. The method of operating storage batteries which consists in bringing a battery approximately to a state of full charge, washing the electrolyte from said battery and tightly sealing said battery to prevent the access of air thereto.

2. Storage battery practice which consists of charging a cell, removing the electrolyte, rinsing the interior of said cell and its contents and tightly sealing said cell.

3. Storage battery practice which consists of charging a cell, removing the electrolyte, rinsing the interior of said cell and its contents with water and tightly sealing said cell.

4. Storage battery practice which consists of charging a cell, washing out the electrolyte with water, allowing to drain and sealing said cell to prevent the access of air.

5. Storage battery practice which consists of thoroughly washing out the electrolyte from the interior of the cell and contents of a substantially charged battery and tightly sealing said cell to prevent access of air.

6. Storage battery practice whereby battery cells may be transported or stored in charged condition without electrolyte, which consists in charging a cell until a predetermined specific gravity of the electrolyte is reached, thoroughly washing out the electrolyte from the interior of said cell and contents, sealing said cell, and when it is desired to put the cell into service again, adding electrolyte of said predetermined specific gravity.

7. Storage battery practice which consists of bringing a battery cell to full charge, eliminating substantially all the electrolyte from said cell, preventing access of air to said cell, and when it is desired to use the cell, adding electrolyte of a predetermined specific gravity.

8. Storage battery practice which consists of bringing a battery cell to full charge, washing the cell contents with water to remove the electrolyte, preventing access of air to said contents and, when it is desired to use said cell, adding electrolyte of predetermined specific gravity.

In witness whereof, I have hereunto subscribed my name.

CAMPBELL C. CARPENTER.